(12) United States Patent
Wu et al.

(10) Patent No.: US 11,067,990 B2
(45) Date of Patent: Jul. 20, 2021

(54) OPERATION METHOD OF AN AGRICULTURE UAV

(71) Applicant: SZ DJI TECHNOLOGY CO., LTD., Shenzhen (CN)

(72) Inventors: Xumin Wu, Shenzhen (CN); Chunming Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 195 days.

(21) Appl. No.: 16/232,861

(22) Filed: Dec. 26, 2018

(65) Prior Publication Data
US 2019/0138010 A1 May 9, 2019

Related U.S. Application Data

(63) Continuation of application No. PCT/CN2016/088042, filed on Jun. 30, 2016.

(51) Int. Cl.
*G05D 1/00* (2006.01)
*B64D 1/18* (2006.01)
(Continued)

(52) U.S. Cl.
CPC ......... *G05D 1/0094* (2013.01); *B64C 39/024* (2013.01); *B64D 1/18* (2013.01);
(Continued)

(58) Field of Classification Search
CPC .... G01S 13/9023; G01S 13/935; G01S 13/93; G01S 13/4454; G01S 13/89; G01S 13/42; G01S 2013/0254; H01Q 3/38
See application file for complete search history.

(56) References Cited

U.S. PATENT DOCUMENTS

2009/0251359 A1 10/2009 Becker et al.
2017/0015416 A1* 1/2017 O'Connor .............. G05D 1/104
(Continued)

FOREIGN PATENT DOCUMENTS

CN  103224026 A  7/2013
CN  103770943 A  5/2014
(Continued)

OTHER PUBLICATIONS

"Terrain following and terrain avoiding radar", Baidu.com [online], Edited Nov. 29, 2015, Retrieved from internet Jul. 15, 2020 URL>https://baike.baidu.com/item/%E5%9C%B0%E5%BD%A2%E8%B7%9F%E9%9A%8F%E5%92%8C%E5%9C%B0%E5%BD%A2%E5%9B%9E%E9%81%BF%E9%9B%B7%E8%BE%BE/9253213) (Year: 2015).*
(Continued)

*Primary Examiner* — James J Lee
*Assistant Examiner* — Shon G Foley
(74) *Attorney, Agent, or Firm* — Anova Law Group, PLLC

(57) ABSTRACT

An operation method of an unmanned aerial vehicle (UAV) includes determining a distance between the UAV and a ground reflector in front of the UAV by using a radar wave emitted obliquely downward by a radar carried by the UAV, determining terrain information in front of the UAV according to the distance between the UAV and the ground reflector in front of the UAV, and adjusting one or more operation parameters of the UAV according to the terrain information.

17 Claims, 10 Drawing Sheets

(51) Int. Cl.
  *G05D 1/08* (2006.01)
  *B64C 39/02* (2006.01)
  *G01S 13/88* (2006.01)
  *G05D 1/10* (2006.01)

(52) U.S. Cl.
  CPC .............. *G01S 13/882* (2013.01); *G05D 1/08* (2013.01); *G05D 1/101* (2013.01); *B64C 2201/12* (2013.01); *B64C 2201/141* (2013.01)

(56) References Cited

U.S. PATENT DOCUMENTS

2018/0275654 A1* 9/2018 Merz .................... G08G 5/0086
2018/0326441 A1* 11/2018 Liu ........................... B05B 1/20

FOREIGN PATENT DOCUMENTS

| CN | 104743119 A | 7/2015 |
|---|---|---|
| CN | 105253303 A | 1/2016 |
| CN | 105292480 A | 2/2016 |
| CN | 205060023 U | 3/2016 |
| CN | 205168911 U | 4/2016 |
| CN | 205221118 U | 5/2016 |
| CN | 205787903 U | 12/2016 |

OTHER PUBLICATIONS

Shanbo Jin, Precautions for aviation operation, Chinese Wheat Science, Aug. 1996, p. 953, China Agriculture Press, China.
Quan Hu, Study on Terrain Detection Technology of Terrain Following Radar, Wanfang Master Thesis, Nov. 25, 2010, p. 1, 3,17.
Liying Yang, Key Technologies and Applications of Drones in Precision Agriculture, High Technology and Industrialization, Jul. 2015, p. 77, Issue 7, CN.
The World Intellectual Property Organization (WIPO) International Search Report for PCT/CN2016/088042 dated Mar. 31, 2017 7 pages.

* cited by examiner

OPERATION METHOD OF AN AGRICULTURE UAV

CROSS-REFERENCE TO RELATED APPLICATION

This application is a continuation application of International Application No. PCT/CN2016/088042, filed on Jun. 30, 2016, the entire contents of which are incorporated herein by reference.

TECHNICAL FIELD

The present disclosure relates to flight technology and, more particularly, to an operation method and system of an agriculture unmanned aerial vehicle (UAV), and an agriculture UAV.

BACKGROUND

Due to the simplicity of operation and high work efficiency, agricultural unmanned aerial vehicles (UAVs) have been widely used in the field of agricultural plant protection. Agricultural UAVs are used to perform pesticide spraying, seed sowing, and other operations.

In conventional technologies, taking using the agricultural UAV to perform the pesticide spraying as an example, in order to spray the pesticide evenly on the surface of the crops, the spraying distance between the agricultural UAV and the crops needs to be maintained. Generally, a radar is provided at the bottom of the agricultural UAV and emits a radar wave toward right below the agricultural UAV. The distance between the agricultural UAV and the crops right below the agricultural UAV is determined according to the radar wave emitted by the radar and the radar echo wave reflected by the crops right below the agricultural UAV. The flight height of the agricultural UAV is adjusted according to the distance, such that the pesticide is evenly sprayed on the surface of the crops right below the UAV.

However, the conventional technologies have a problem that the agricultural UAVs are less efficient in the operations.

SUMMARY

In accordance with the disclosure, there is provided an operation method of an unmanned aerial vehicle (UAV) including determining a distance between the UAV and a ground reflector in front of the UAV by using a radar wave emitted obliquely downward by a radar carried by the UAV, determining terrain information in front of the UAV according to the distance between the UAV and the ground reflector in front of the UAV, and adjusting one or more operation parameters of the UAV according to the terrain information.

Also in accordance with the disclosure, there is provided an operation method of an unmanned aerial vehicle (UAV) including emitting a radar wave toward ground in front of the UAV, receiving an echo after the radar wave reflected by a ground reflector in front of the UAV, and determining a distance between the UAV and the ground reflector in front of the UAV according to the radar wave and the echo.

Also in accordance with the disclosure, there is provided an operation system of an unmanned aerial vehicle (UAV) including a radar provided at the UAV and a controller communicatively connected to the radar. The radar is configured to determine a distance between the UAV and a ground reflector in front of the UAV. The controller is configured to determine terrain information in front of the UAV according to the distance between the UAV and the ground reflector in front of the UAV, and adjust one or more operation parameters of the UAV according to the terrain information.

BRIEF DESCRIPTION OF THE DRAWINGS

The following drawings merely illustrate embodiments of the present disclosure. It will be appreciated that the following drawings are part rather than all of the drawings of the present disclosure. Other drawings may be obtained based on the disclosed drawings by those skilled in the art without creative efforts.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure. In the situation where the technical solutions described in the embodiments are not conflicting, they can be combined.

Embodiments of the disclosure can be implemented by an agriculture unmanned aerial vehicle (UAV). The agricultural UAV consistent with the disclosure can perform operations, such as pesticide spraying, seed sowing, or the like, with a higher efficiency than conventional agricultural UAVs.

Figure 1:
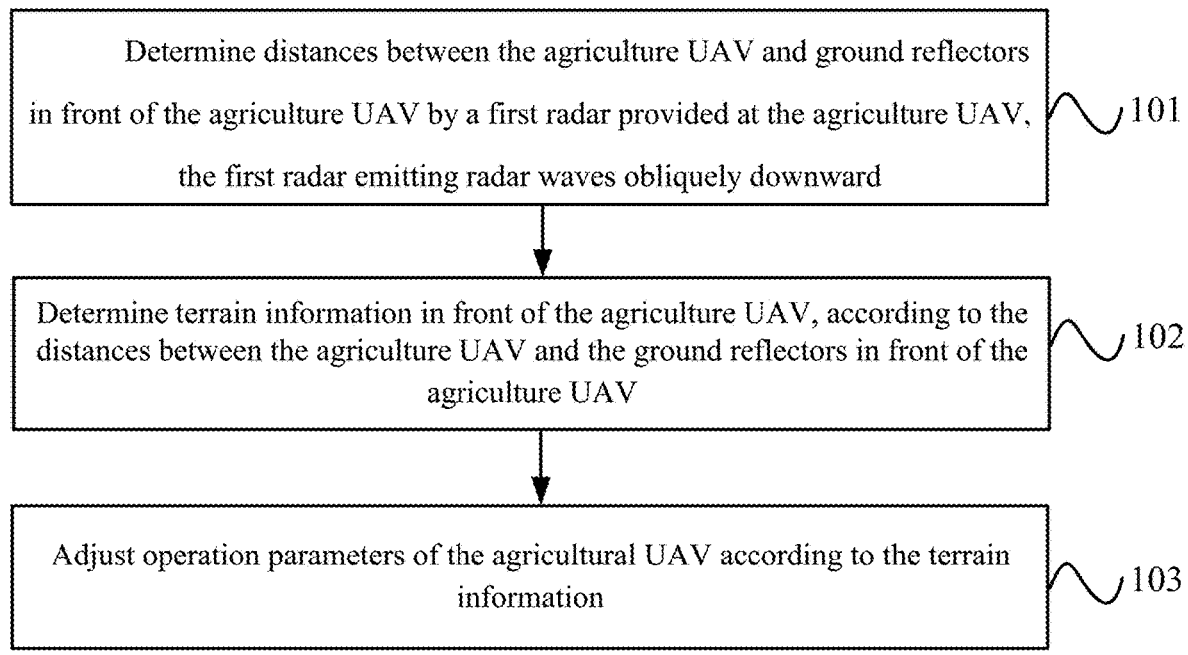
FIG. 1 is a flow chart of an operation method of an agriculture unmanned aerial vehicle (UAV) according to an embodiment of the disclosure.

FIG. 1 is a flow chart of an exemplary operation method of the agriculture UAV consistent with the disclosure. The executing body of the method can be a controller of the agricultural UAV.

As shown in FIG. 1, at 101, distances between the agriculture UAV and ground reflectors in front of the agriculture UAV are determined by a first radar provided at the agriculture UAV. The first radar emits radar waves obliquely downward.

The first radar can include a radar whose antenna is a directional antenna. The directional antenna has a strong directionality. In contrast, an omnidirectional antenna can emit radar waves to all directions. Since the agricultural UAV focuses on terrain information in a specific direction during the operation, the directional radar can be used in the agricultural UAV. In some embodiments, the first radar can emit the radar waves obliquely downward to determine the distances between the agriculture UAV and the ground reflectors in front of the agriculture UAV. The first radar can include, for example, a pulse radar or a continuous-wave radar. Theoretically, transmission characteristics of the radar waves emitted by the radar are close to the transmission characteristics of the light waves. Obliquely incident radar waves may undergo specular reflections on a horizontal ground, and the radar may fail to receive any echoes. However, due to the special operation environment of the agricultural UAV, the radar waves irradiate the rough surfaces or sparse leaves with irregular surfaces during the operation. As such, a part of the diffusely reflected radar waves can be received as echoes by the radar. Therefore, the distances between the agriculture UAV and the ground reflectors in front of the agriculture UAV can be determined by the first radar that emits the radar waves obliquely downward. In some embodiments, the first radar can be an integral part of the agriculture UAV or a separate part provided at the agriculture UAV.

At 102, the terrain information in front of the agriculture UAV is determined according to the distances between the agriculture UAV and the ground reflectors in front of the agriculture UAV.

The terrain information refers to information for describing the terrain. The terrain refers to various morphologies of ground surface, e.g., various undulating morphs exhibited by the fixed objects distributed above the ground surface. As the agricultural UAV is in flight during the operation, the ground reflector in front of the agricultural UAV will change with the flight of the agricultural UAV. As such, the terrain information in front of the agriculture UAV can be determined according to the distances between the agriculture UAV and the ground reflectors in front of the agriculture UAV.

At 103, operation parameters of the agricultural UAV are adjusted according to the terrain information.

The operation parameters can include parameters related to controlling the flight of the agricultural UAV (e.g., route parameters), and/or parameters related to controlling a task apparatus of the agricultural UAV (e.g., task parameters). The objective of adjusting the operation parameters of the agricultural UAV is to enable the agricultural UAV to accurately complete the tasks, for example, to enable the pesticide to be evenly sprayed on the surface of the crops. The operation parameters of the agricultural UAV can be adjusted according to the terrain information in front of the agricultural UAV, such that the operation parameters of the agricultural UAV can be adjusted in advance, thereby improving the work efficiency of the agricultural UAV during the operation.

According to the embodiment of the disclosure, the distances between the agriculture UAV and the ground reflectors in front of the agriculture UAV can be determined by the first radar provided at the agriculture UAV. The terrain information in front of the agriculture UAV can be determined according to the distances. The operation parameters of the agricultural UAV can be adjusted according to the terrain information. As such, the operation parameters of the agricultural UAV can be adjusted in advance, thereby improving the work efficiency of the agricultural UAV during the operation.

In addition, for some special terrains, such as the terraced terrain on the hills, a sudden change of terrain in front of the agricultural UAV can be obtained by the first radar, such that an attitude of the agricultural UAV can be adjusted in a timely manner to prevent the agricultural UAV from directly hitting the ground in front of the agricultural UAV.

Figure 2:
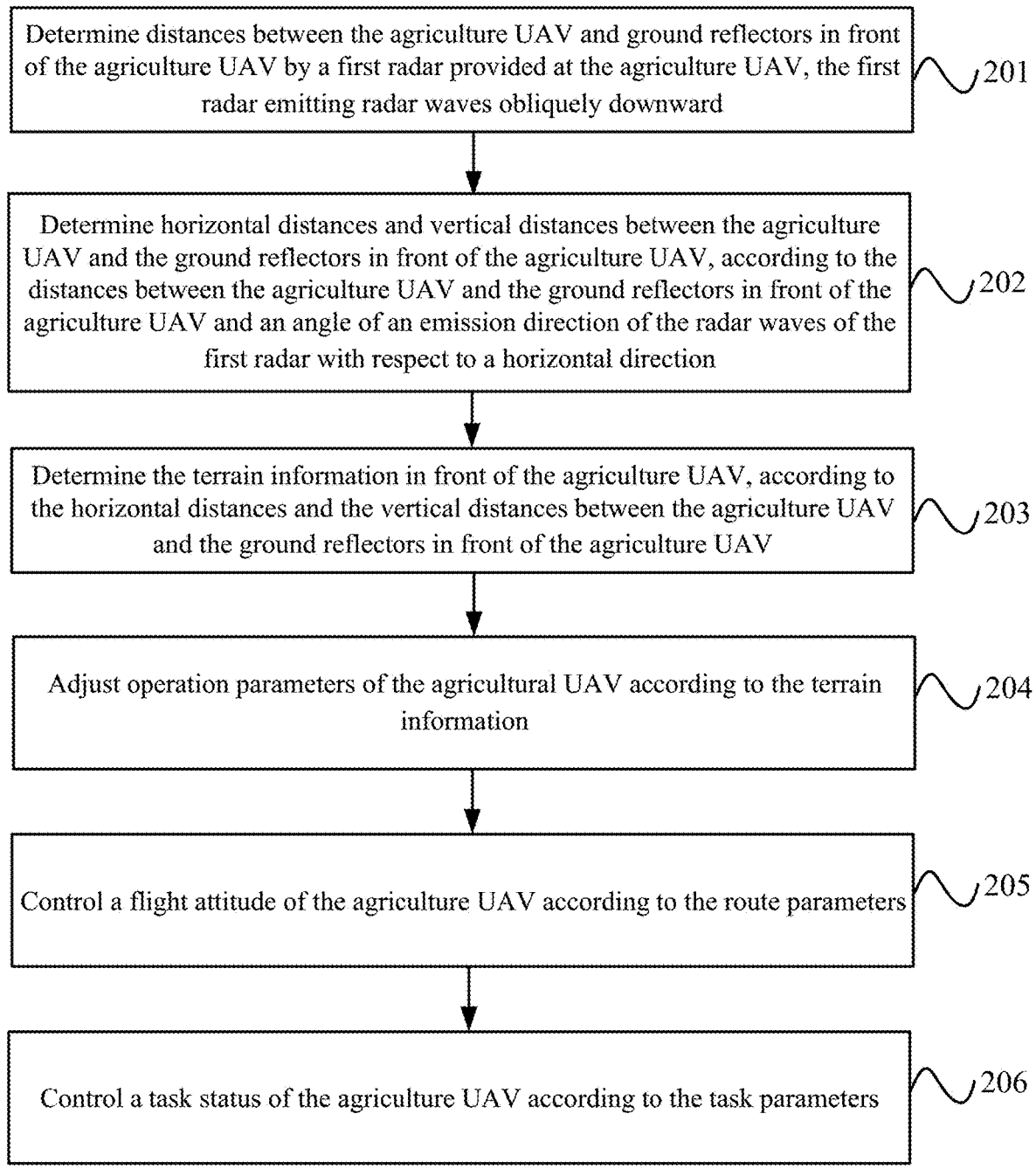
FIG. 2 is a flow chart of another operation method of an agriculture UAV according to another embodiment of the disclosure.

FIG. 2 is a flow chart of another exemplary operation method of an agriculture UAV consistent with the disclosure. The executing body of the method can be the controller of the agricultural UAV. In some embodiments, determining the terrain information in front of the agriculture UAV according to the distances between the agriculture UAV and the ground reflectors in front of the agriculture UAV can include the following processes.

As shown in FIG. 2, at 201, the distances between the agriculture UAV and ground reflectors in front of the agriculture UAV are determined by the first radar provided at the agriculture UAV. The first radar emits the radar waves obliquely downward.

The ground reflectors can include the ground and/or objects on the ground (e.g., the crops, the signal tower, the power tower, or the like). In some embodiments, the distances between the agriculture UAV and ground reflectors in front of the agriculture UAV can be determined by the first radar and the first radar can be provided at the agriculture UAV.

At 202, horizontal distances and vertical distances between the agriculture UAV and ground reflectors in front of the agriculture UAV are determined according to the distances between the agriculture UAV and the ground reflectors in front of the agriculture UAV and an angle of an emission direction of the radar waves of the first radar with respect to the horizontal direction.

Figure 3:
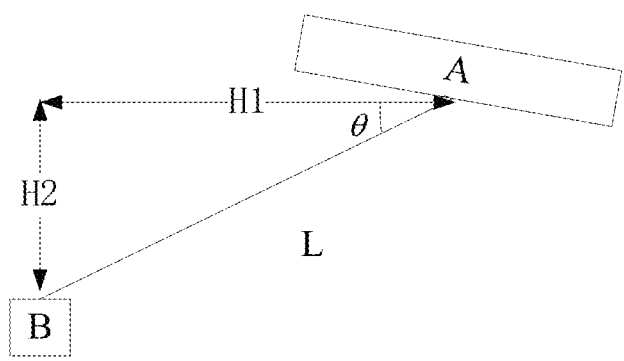
FIG. 3 schematically shows determining a horizontal distance and a vertical distance according to an embodiment of the disclosure.

FIG. 3 schematically shows determining the horizontal distance and the vertical distance consistent with the disclosure. As shown in FIG. 3, A denotes the agriculture UAV, B denotes the ground reflector in front of the agriculture UAV, L denotes the distance between the agriculture UAV A and ground reflector B measured by the first radar, and θ denotes the angle of the emission direction of the radar waves of the first radar with respect to the horizontal direction. In some embodiments according to the distance L and the angle θ, the horizontal distance H1 between the agricultural UAV A and the ground reflector B can be determined using the following formula:

$$H1 = L \times \cos(\theta)$$

According to the distance L and the angle θ, the vertical distance H2 between the agricultural UAV A and the ground reflector B can be determined using the following formula:

$$H2 = L \times \sin(\theta)$$

In some embodiments, before the process at 202, the method can further include: determining the emission direction of the radar waves of the first radar according to a direction of the antenna of the first radar. The direction of the antenna of the first radar can be considered as an emission direction of the antenna of the first radar. When the antenna is emitting in a certain direction, the emission direction of the radar waves can also be that direction.

In some embodiments, the direction of the antenna of the first radar can be determined according to an installation angle of the first radar. The antenna of the first radar can be fixed relative to the first radar, therefore, after the first radar is installed at the agricultural UAV, the direction of the antenna of the first radar can also be fixed relative to the agricultural UAV. As such, the direction of the antenna of the first radar can be determined according to the installation angle of the first radar. In some embodiments, in order to enable the radar waves of the first radar to be emitted obliquely downward, assume that the antenna of the first radar is provided at a first surface of the first radar and a mounting component for mounting the first radar at the agricultural UAV is provided at a second surface of the first radar, and if the first surface is opposite to the second surface, the first radar can be installed at a frame of the agricultural UAV or a load of the frame of the agricultural UAV obliquely with respect to a heading axis of the agricultural UAV, such that the radar waves of the first radar can be obliquely emitted downward. In some other embodiments, the first radar can be installed at the frame of the agricultural UAV or at the load of the frame of the agricultural UAV obliquely with respect to a heading axis of the first radar. The load can include equipment that can be carried on the frame, for example, a photographing device, a gimbal, a holding tank, or the like.

Figure 4:
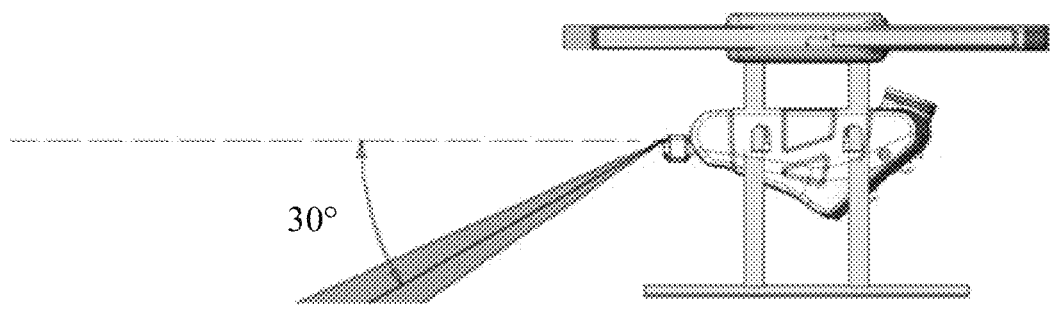
FIG. 4 schematically shows a first radar provided at an agriculture UAV emitting radar waves obliquely downward according to an embodiment of the disclosure.

FIG. 4 schematically shows a first radar provided at an agriculture UAV emitting radar waves obliquely downward, when the agricultural UAV is in a level flight attitude. As shown in FIG. 4, if the agricultural UAV is in the level flight attitude, the direction of the antenna of the first radar can be determined only based on the installation angle of the first radar. However, if the agricultural UAV is in another flight attitude (e.g., diving, climbing, rolling, accelerating, decelerating, or the like), the direction of the antenna of the first radar determined only based on the installation angle of the first radar may be inaccurate. In some embodiments, the direction of the antenna of the first radar can be determined according to the installation angle of the first radar and current flight attitude information of the agricultural UAV. The flight attitude information can include the flight attitude. The flight attitude can include, for example, level flight, climbing, diving, rolling, or the like. When the flight attitude is not the level flight attitude, the flight attitude information can also include an attitude angle corresponding to the flight attitude. In some embodiments, the flight attitude information can be obtained by a motion sensor provided at the agricultural UAV, and the motion sensor can include, for example, an Inertial Measurement Unit (IMU), an accelerometer, a gyroscope, a compass, an altimeter, or the like.

Figure 5:
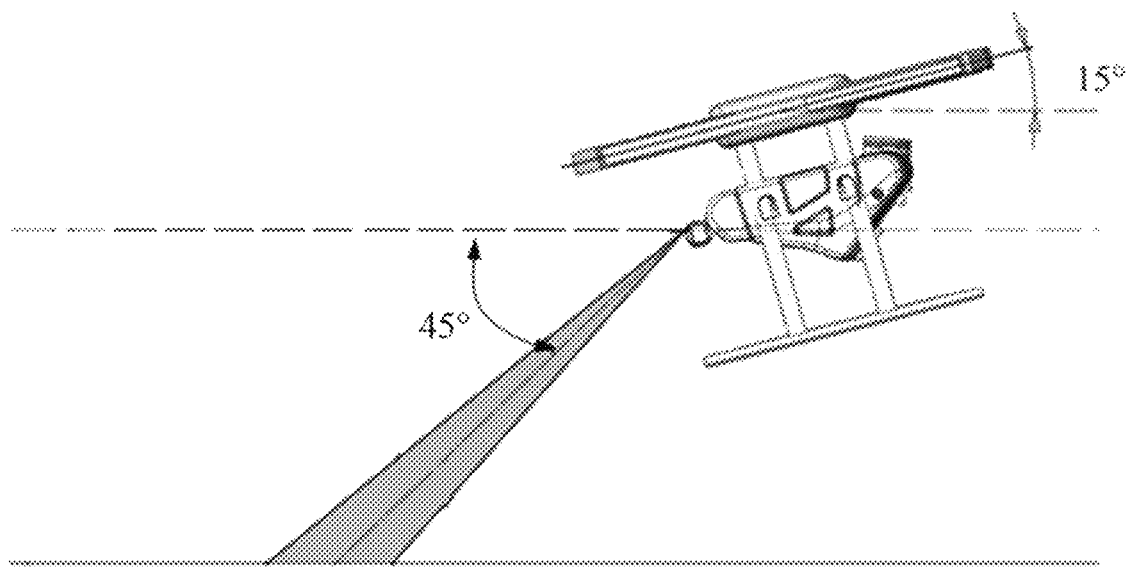
FIG. 5 schematically shows the first radar provided at the agriculture UAV emitting radar waves obliquely downward according to another embodiment of the disclosure.

In the example shown in FIG. 4, when the agricultural UAV is in the level flight attitude, the angle of the antenna of the first radar with respect to the horizontal direction is determined as 30° according to the installation angle of the first radar. FIG. 5 schematically shows the first radar provided at the agriculture UAV emitting radar waves obliquely downward, when the agricultural UAV is in a diving flight attitude. As shown in FIG. 5, when the agricultural UAV is in the diving flight attitude, the angle of the antenna of the first radar with respect to the horizontal direction is determined as 45° according to the installation angle of the first radar and the current flight attitude of the agricultural UAV (e.g., the attitude angle is 15°).

At 203, the terrain information in front of the agriculture UAV is determined according to the horizontal distances and the vertical distances between the agriculture UAV and the ground reflectors in front of the agriculture UAV.

Assume that the agricultural UAV obtains the distances from three frontal reflectors a, b, and c in sequence. The horizontal distance and the vertical distance from a are determined as Ha1 and Ha2, respectively, according to the distance from a. The horizontal distance and the vertical distance from b are determined as Hb1 and Hb2, respectively, according to the distance from b. The horizontal distance and the vertical distance from c are determined as Hc1 and Hc2, respectively, according to the distance from c. If Ha1=Hb1=Hc1 and Ha2=Hb2=Hc2, the terrain in front of the agricultural UAV can be determined as flat. If Ha1>Hb1>Hc1 and Ha2>Hb2>Hc2, the terrain in front of the agricultural UAV can be determined as rising. If Ha1<Hb1<Hc1 and Ha2<Hb2<Hc2, the terrain in front of the agricultural UAV can be determined as descending. When the terrain rises or descends, a terrain slope can be determined based on the specific values of Ha1, Hb1, Hc1, Ha2, Hb2, and Hc2. It will be appreciated by those skilled in the art that the relationship among Ha1, Hb1, and Hc1 and the relationship among Ha2, Hb2, and Hc2 are described merely for illustrating that the terrain information in front of the agriculture UAV can be determined according to the horizontal distances and the vertical distances between the agriculture UAV and ground reflectors in front of the agriculture UAV. Those examples are considered as exemplary only and not intended to limit the implementation manner of determining the terrain information according to the horizontal distances and the vertical distances.

At 204, the operation parameters of the agricultural UAV are adjusted according to the terrain information.

The operation parameters can include the route parameters and/or the task parameters. The route parameters can be configured to indicate a flight route of the agricultural UAV and can include a flight position and a flight height corresponding to the flight position. The task parameters can be configured to indicate control parameters of the task apparatus of the agricultural UAV and can include a value of, e.g., a pump pressure of the task apparatus, a rotation speed of a motor of the task apparatus, or the like. When the operation parameters include the route parameters, the process at 205 can be further implemented. When the operation parameters include the task parameters, the process at 206 can be further implemented. When the operation parameters include both the route parameters and the task parameters, the processes at 205 and 206 can be both implemented. It is not intended to limit a sequence of the implementation of the processes at 205 and 206. In some embodiments, as shown in FIG. 2, the processes at 205 and 206 are both implemented and the implementation of the process at 205 can be before the implementation of the process at 206. Adjusting the route parameters of the agricultural UAV may adjust the results of the task of the agricultural UAV and avoid obstacles (such as signal tower, electric power tower, or the like). Adjusting the task parameters of the agricultural UAV may adjust the results of the task of the agricultural UAV. The route parameters only, the task parameters only, or both the route parameters and the task parameters can be adjusted according to the actual needs.

At 205, the flight attitude of the agricultural UAV is controlled according to the route parameters.

The flight attitude of the agricultural UAV can be controlled by controlling a kinetic device of the agricultural UAV. The kinetic device can include one or more propellers and one or more motors for driving the one or more propellers to rotate. The speeds of the one or more motors can be controlled according to the route parameters, such that the control of the flight attitude of the agricultural UAV can be realized. By controlling the flight attitude of the agricultural UAV according to the route parameters, the flight path of the agricultural UAV can be changed with the change of terrain in front of the agricultural UAV. Furthermore, the fixed relative height between the agricultural UAV and the ground below the agricultural UAV or the reflectors on the ground can be realized, the agricultural UAV can avoid obstacles as early as possible, or the like. When a spray density and a spray range of a spray head of the task apparatus are fixed, the higher relative height corresponds to the larger spray range and the smaller spray density. Therefore, the spray density and the spray range can be controlled by adjusting the relative height. In some embodiments, the process at 205 can be implemented immediately after the route parameters are adjusted at 204. In some other embodiments, the process at 205 can be implemented after the agricultural UAV flies to a geographic area corresponding to the terrain information.

At 206, a task status of the agricultural UAV is controlled according to the task parameters.

The task status of the agricultural UAV can be controlled by controlling the task apparatus provided at the agricultural UAV. The task apparatus can include, for example, a pesticide spraying apparatus, a seeding apparatus, or the like. The task apparatus can include a holding tank, a conduit, a pump, a spray head, or the like. An end of the conduit can extend into the holding tank, the other end of the conduit can be connected to a suction inlet of the pump, and a discharge outlet of the pump can be connected to the spray head. The pump can be configured to eject substance to be sprayed in the holding tank from the spray head through the conduit. In some embodiments, the value of a pump pressure can be controlled according to the task parameters. The larger value of the pump pressure corresponds to more objects to be sprayed from the spray head per unit time, thus, the spray density can be controlled by controlling the value of the pump pressure. In some embodiments, the task apparatus can further include the motor for driving a deflection plate of the spray head to rotate. The rotation speed of the motor can be controlled according to the task parameters. The faster rotation speed of the motor that drives the deflection plate of the spray head may correspond to a larger spray radius of the spray head, and therefore, the spray range can be controlled by adjusting the rotation speed of the motor that drives the deflection plate of the spray head. In some embodiments, the process at 206 can be implemented when the agricultural UAV flies to the geographic area corresponding to the terrain information.

According to the embodiment of the disclosure, the distances between the agriculture UAV and the ground reflectors in front of the agriculture UAV can be determined by the first radar provided at the agriculture UAV. The horizontal distances and the vertical distances between the agriculture UAV and the ground reflectors in front of the agriculture UAV can be determined according to the distances between the agriculture UAV and the ground reflectors in front of the agriculture UAV. The terrain information in front of the agriculture UAV can be determined according to the horizontal distances and the vertical distances between the agriculture UAV and the ground reflectors in front of the agriculture UAV. As such, the operation parameters of the agricultural UAV can be adjusted in advance, and the work efficiency of the agricultural UAV during the operation can be improved.

Figure 6:
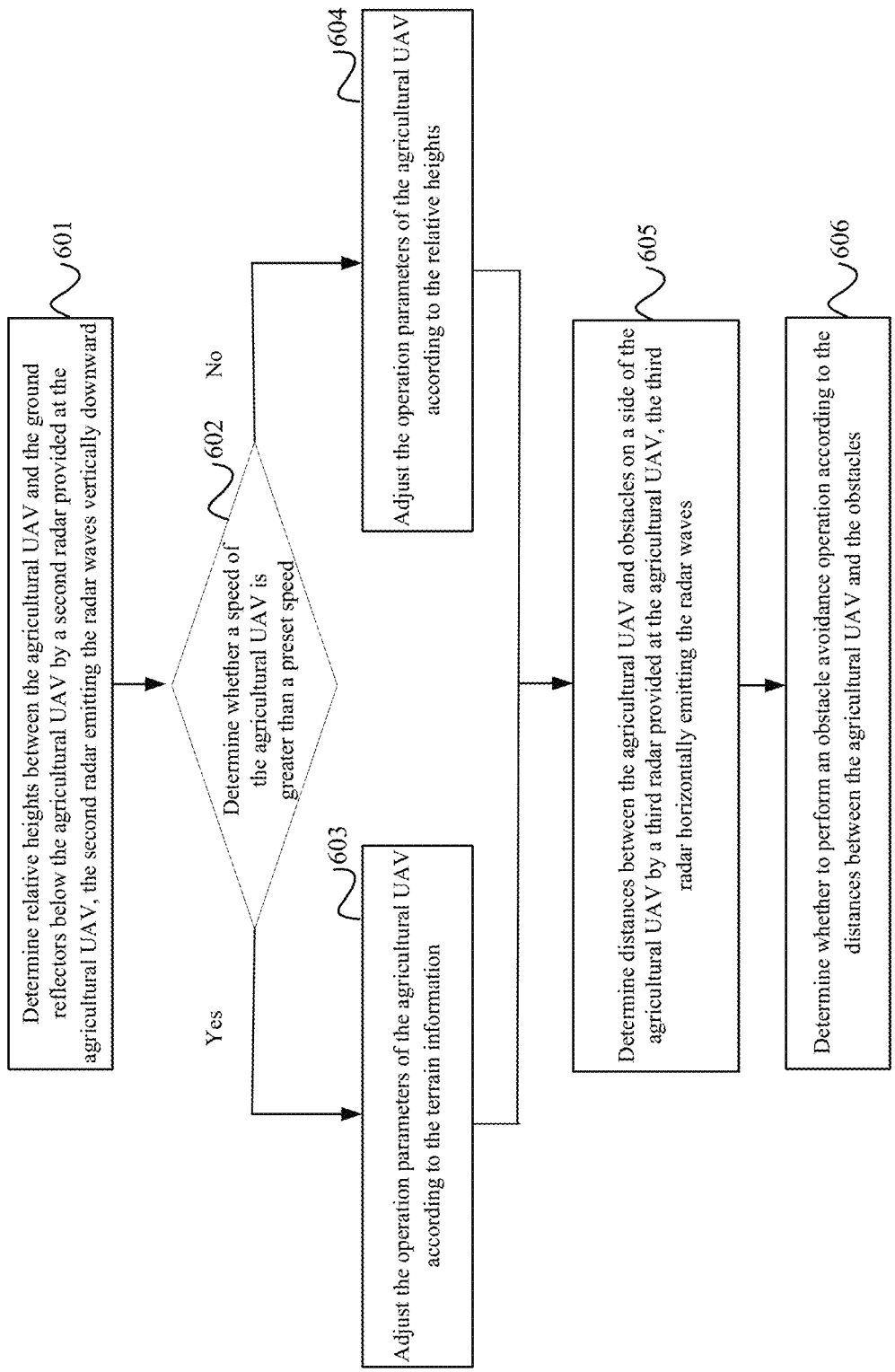
FIG. 6 is a flow chart of another operation method of an agriculture UAV according to another embodiment of the disclosure.

FIG. 6 is a flow chart of another exemplary operation method of an agriculture UAV consistent with the disclosure. The executing body of the method can be the controller of the agriculture UAV. In some embodiments, adjusting the operation parameters of the agriculture UAV according to the terrain information can include the following processes.

As shown in FIG. 6, at 601, the relative heights between the agricultural UAV and the ground reflectors below the agricultural UAV are determined by a second radar provided at the agricultural UAV. The second radar emits the radar waves vertically downward.

The second radar can be provided below the agricultural UAV. In some embodiments, the second radar can be provided below the frame of the agricultural UAV or below the load of the frame. The frame can include a fuselage, a stand, or the like, and the second radar can be provided below the fuselage or the stand. The load of the frame can be, for example, the holding tank, the gimbal, the photographing device, or the like, described above.

At 602, whether a speed of the agricultural UAV is greater than a preset speed is determined.

When the speed of the agricultural UAV is determined to be greater than the preset speed, the process at 603 is performed; when the speed of the agricultural UAV is determined to be less than or equal to the preset speed, the process at 604 is performed. When the speed of agricultural UAV is low, the requirement of an adjustment speed of the task parameters of the agricultural UAV is also low. In this situation, timely adjustment of the task parameters of the agricultural UAV can be achieved based on the relative heights from the ground reflections underneath the agricultural UAV to the agricultural UAV. Therefore, when the speed of the agricultural UAV is less than or equal to the preset speed (602: No), the task parameters of the agricultural UAV can be adjusted in real time by implementing the process at 604. When the speed of agricultural UAV is high, the requirement of the adjustment speed of the task parameters of the agricultural drones is also high. In this situation, the task parameters of the agricultural UAV cannot be adjusted in time according to the relative heights from the ground reflectors underneath the agricultural UAV to the agricultural UAV, and the task parameters need to be adjusted in advance according to the terrain information in front of the agricultural UAV. Therefore, when the speed of the agricultural UAV is greater than the preset speed (602: Yes), the process at 603 is implemented to adjust the task parameters of the agricultural UAV in advance.

At 603, the operation parameters of the agricultural UAV are adjusted according to the terrain information.

The process at 603 is similar to the process at 204. The details thereof are omitted herein. Similarly, the processes at 205 and 206 can also be implemented after the process at 603.

At 604, the operation parameters of the agricultural UAV can be adjusted based on the relative heights.

The operation parameters can include the above-described route parameters and/or task parameters. Adjusting the results of the task of the agricultural UAV can be achieved by adjusting the route parameters and/or adjusting the task parameters. After the operation parameters are adjusted, the flight attitude can be further adjusted according to the route parameters, and the task status can be adjusted according to the task parameters. When a fixed relative height (for example, a preset height) between the agricultural UAV and the ground reflector under the agricultural UAV needs to be ensured, the flight attitude can be achieved by adjusting the route parameters (e.g., the flight altitude) of the agricultural UAV. When the spray density of the agricultural UAV needs to be ensured, the adjustment of the flight attitude can be achieved by adjusting the route parameters of the agricultural UAV and/or adjusting the task parameters to adjust the operating status. The specific implementation of controlling the flight attitude of the agricultural UAV according to the route parameters and controlling the operating status of the agricultural UAV according to the task parameters are similar to the processes at 205 and 206 described above, and details thereof are omitted herein.

Because the first radar emits the radar waves obliquely downward, based on the principle of specular reflection and the actual operation environment, the echoes corresponding to the radar waves emitted by the first radar can be weaker than the echoes corresponding to the radar waves emitted vertically downward by the second radar. Radar ranging is based on the measurements of the echoes, such that the results measured by the second radar can be more accurate than the results measured by the first radar. Therefore, when the terrain information indicates that the terrain in front of the agricultural UAV is flat, the distances determined by the first radar can be adjusted according to the relative heights determined by the second radar, such that the accuracy of the distances determined by the first radar can be improved. In some embodiments, the method also includes: when the terrain information indicates that the terrain in front of the agricultural UAV is flat, adjusting the distances between the agricultural UAV and the ground reflectors in front of the agricultural UAV determined by the first radar according to the relative heights. That is, when the terrain is flat, the distances determined by the first radar can be adjusted according to the principle that the vertical distances determined based on the distances determined by the first radar are equal to the relative heights determined by the second radar.

In some embodiments, a dedicated obstacle avoidance radar (i.e., a third radar) can also be used to implementing the following processes at 605 and 606 to realize the avoidance operation of the agricultural UAV.

At 605, distances between the agricultural UAV and the obstacles on a side of the agricultural UAV is determined by the third radar provided at the agricultural UAV. The third radar horizontally emits the radar waves.

In some embodiments, the third radar can be provided in front of the frame of the agricultural UAV or in front of the load of the frame, and/or behind the frame or behind the load. The obstacles can include objects, such as buildings, signal towers, power towers, and other flying objects that may affect the flight of the agricultural UAV. Both the first radar and the third radar can determine the distances between the agricultural UAV and the obstacles, but because of the different directions of the radar waves emitted by the first radar and the third radar, the types of targeted obstacles are different. The first radar can be mainly for obstacles on the ground, and the third radar can be mainly for obstacles in the air that are equivalent to the height of the agricultural UAV.

At 606, whether to perform an obstacle avoidance operation is determined according to the distances between the agricultural UAV and the obstacles.

When the distances between the agricultural UAV and the obstacles are greater than a preset distance, the obstacle avoidance operation does not need to be performed. When the distances between the agricultural UAV and the obstacles are less than or equal to the preset distance, the obstacle avoidance operation can be performed. The obstacle avoidance operation can be, for example, changing the flight attitude of the agricultural UAV.

It is not intended to limit the implementation sequence of the processes 605 and 606, and the processes 601 to 604.

According to the embodiment of the disclosure, when the speed of the agricultural UAV is greater than the preset speed, the operation parameters can be adjusted according to the terrain information, and when the speed of the agricultural UAV is less than the preset speed, the operation parameters of the agricultural UAV can be adjusted according to the relative heights from the ground reflectors underneath the agricultural to the agricultural UAV. As such, when the task parameters of the agricultural UAV cannot be adjusted in time according to the relative heights from the ground reflectors underneath the agricultural UAV to the agricultural UAV, the task parameters of the agricultural UAV can be adjusted in advance according to the terrain information in front of the agricultural UAV. The efficiency of adjusting the operation parameters of the agricultural UAV can be improved, thereby improving the work efficiency of the agricultural UAV during the operation.

Figure 7:
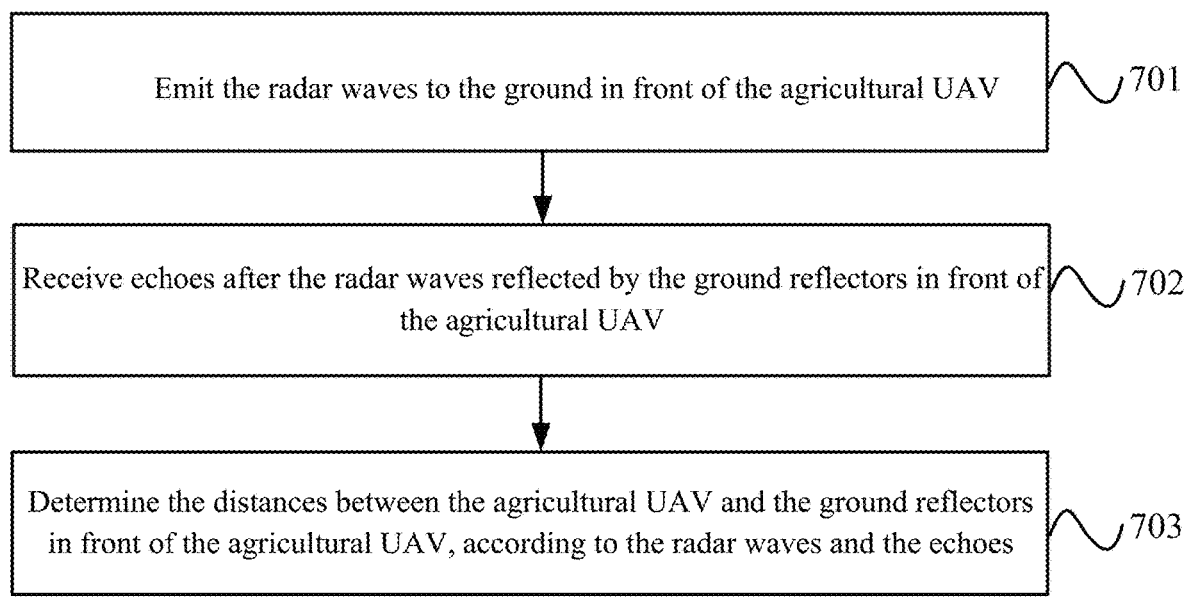
FIG. 7 is a flow chart of another operation method of an agriculture UAV according to another embodiment of the disclosure.

FIG. 7 is a flow chart of another exemplary operation method of an agriculture UAV consistent with the disclosure. In some embodiments, determining the distances between the agriculture UAV and the ground reflectors in front of the agriculture UAV by the first radar provided at the agriculture UAV can include implementing the following processes.

As shown in FIG. 7, at 701, the radar waves are emitted to the ground in front of the agricultural UAV.

Theoretically, transmission characteristics of the radar waves emitted by the first radar are close to the transmission characteristics of light waves. Obliquely incident radar waves may undergo specular reflections on a horizontal ground, and the first radar may fail to receive any echoes. However, due to the special operation environment of the agricultural UAV, the radar waves irradiate the rough surfaces or sparse leaves with irregular surfaces during the operation. As such, a part of the diffusely reflected radar waves can be received as echoes by the radar. Therefore, the first radar can emit the radar waves to the ground in front of the agricultural UAV, and echoes reflected by ground reflectors in front of the agricultural UAV can be received in process at 702.

At 702, the echoes are received after the radar waves reflected by the ground reflectors in front of the agricultural UAV.

The ground reflectors can include the ground, the crops on the ground, or the like.

At 703, the distances between the agricultural UAV and the ground reflectors in front of the agricultural UAV are determined, based on the radar waves and the echoes.

Figure 8:
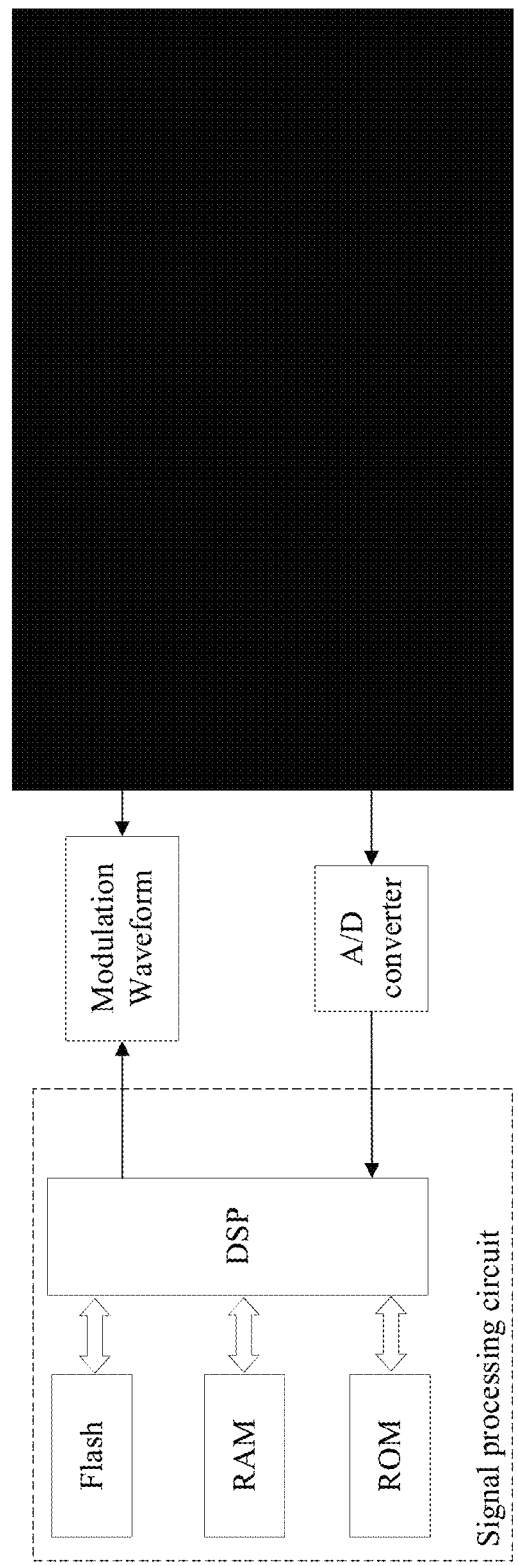
FIG. 8 is a schematic structure diagram of the first radar according to an embodiment of the disclosure.

FIG. 8 is a schematic structure diagram of an example of the first radar consistent with the disclosure. In the example shown in FIG. 8, the first radar is a frequency-modulated continuous wave (FMCW) radar. As shown in FIG. 8, the first radar includes a signal processing circuit and a radio frequency (RF) front-end circuit. The signal processing circuit includes a controller, for example, a digital signal processor (DSP), or the like, and is configured to generate a modulated signal and determine the distance according to a difference-frequency signal acquired by an analog-to-digital (A/D) converter. The signal processing circuit also includes one or more memories for storing data, such as a FLASH, a random-access memory (RAM), a read-only memory (ROM), or the like. The RF front-end circuit includes two channels. The first channel is configured to emit, for example, the radar wave, and the second channel is configured to receive, for example, the echo of the radar wave. The first channel can regulate a voltage of a modulation waveform generated by the signal processing circuit through a Voltage Controlled Oscillator (VCO) to generate a linear frequency-modulated (LFM) signal, for example, having a transmission frequency of 24 GHz. After being amplified by a power amplifier (PA), the LFM signal can be emitted toward the ground in front of the agricultural UAV via a transmission antenna TX (the wave emitted by the transmitting antenna TX is the radar wave described at 701). The radar wave emitted by the transmitting antenna TX can be reflected by the ground reflector in front of the agricultural UAV, and the reflected signal (i.e., the echo described at 702) can be received by the second channel via the receiving antenna RX. The received signal can be low-noise amplified by a low-noise amplifier (LNA), and the low-noise amplified signal can be mixed (the mixing refers to mixing the signal corresponding to the radar wave and the signal corresponding to the echo) to get the difference-frequency signal. Further, after the difference-frequency signal is acquired by the A/D converter and inputted into the signal processing circuit, the signal processing circuit can determine the distance according to the difference-frequency signal. The above-described first channel and second channel also include power dividers (PDs), respectively. The above-described receiving antenna and transmitting antenna can include a microstrip antenna.

Figure 9:
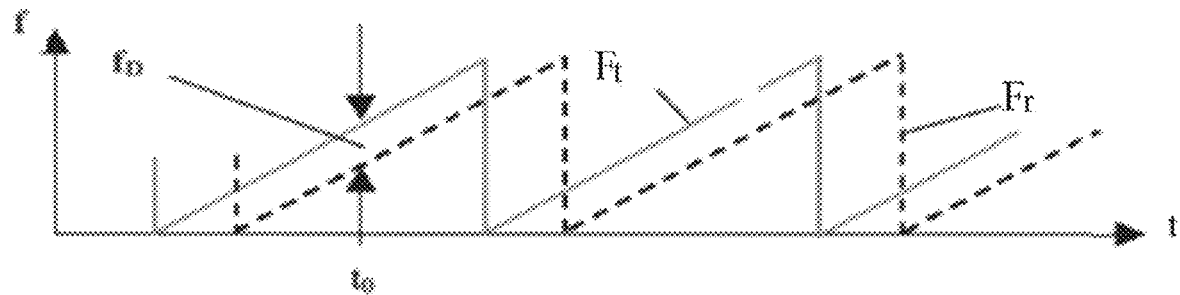
FIG. 9 is a time-dependence curve of a frequency curve of an emitted signal of the first radar and a frequency curve of a received signal.

When being determined by the difference-frequency signal, the distance can be determined by the time delay between the signal corresponding to the radar wave (i.e., a transmitted signal) and the signal corresponding to the echo (i.e., a received signal). Taking the modulated signal being a sawtooth-modulated signal as an example, FIG. 9 is a time-dependence curve of a frequency curve of the emitted signal of the first radar (i.e., an emission frequency curve) and a frequency curve of the received signal (i.e., a receiving frequency curve). As shown in FIG. 9, f denotes frequency and t denotes time. A difference between the emission frequency curve $F_t$ and the receiving frequency curve $F_r$ is the time delay. An instantaneous received signal at a time t0 has a frequency lower than the instantaneous emission frequency for an upslope curve, because the frequency of the transmitted signal is in a constantly rising state. If the transmitted signal and the received signal are mixed in the mixer, a constant difference-frequency signal $f_D$ is generated, which contains the required distance information. In addition, the higher the frequency of the difference-frequency signal $f_D$ corresponds to a farther distance from a target. In some embodiments, the following formulas can determine a relationship between the distance R and the difference-frequency signal $f_D$.

$$R = C_0 \cdot \frac{1}{f} \cdot \frac{f_D}{\Delta f}$$

$$R = C_0 \cdot T \cdot \frac{f_D}{\Delta f}$$

where R denotes the distance, $\Delta f$ denotes a frequency-modulation width, T denotes a period of the sawtooth wave, f denotes a frequency-modulation speed, $C_0$ denotes the speed of light, and $f_D$ denotes the difference-frequency signal.

Consistent with the embodiments of the present disclosure, the first radar provided at the agricultural UAV can emit the radar waves toward the ground in front of the agricultural UAV, receive the echoes after the radar waves reflected by the ground reflectors in front of the agricultural UAV, and determine the distances between the agricultural UAV and the ground reflectors in front of the agricultural UAV based on the radar waves and the echoes. As such, the distances between the agriculture UAV and the ground reflectors in front of the agriculture UAV can be determined by the first radar. The terrain information in front of the agriculture UAV can be determined according to the distances between the agriculture UAV and the ground reflectors in front of the agriculture UAV. The operation parameters of the agricultural UAV can be adjusted according to the terrain information. As such, the operation parameters of the agricultural UAV can be adjusted in advance, thereby improving the work efficiency of the agricultural UAV during the operation.

Figure 10:
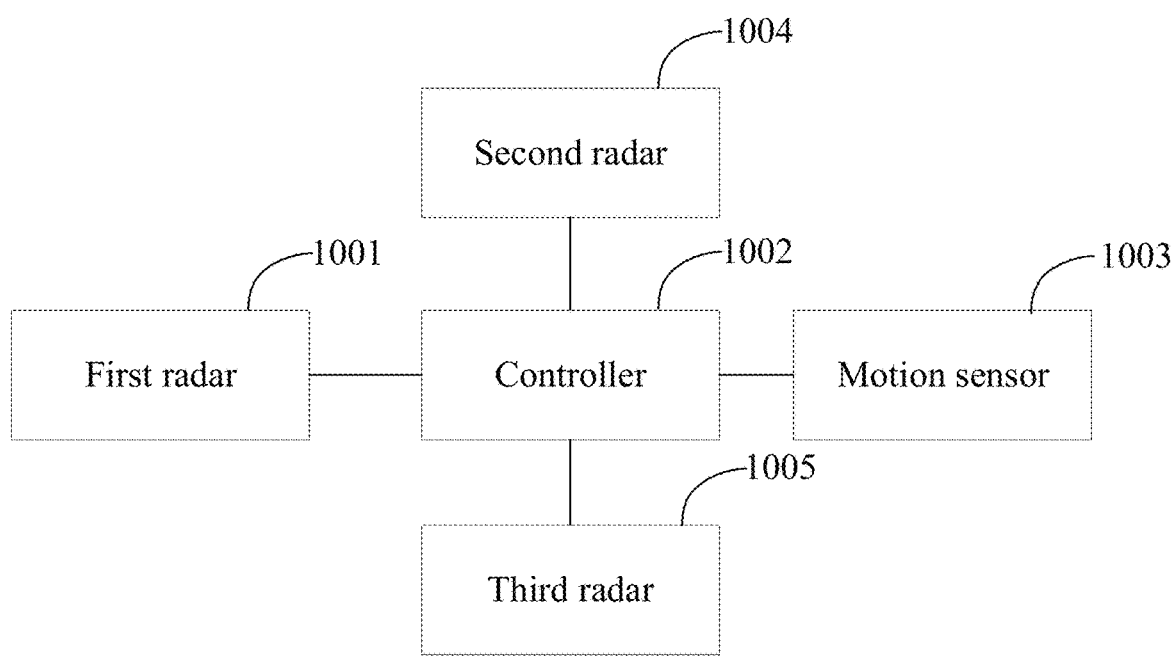
FIG. 10 is a schematic structure diagram of an operation system of an agriculture UAV according to an embodiment of the disclosure.

FIG. 10 is a schematic structure diagram of an operation system of an agriculture UAV consistent with the disclosure. As shown in FIG. 10, the operation system of the agriculture UAV includes a first radar 1001 provided at the agriculture UAV and a controller 1002 of the agriculture UAV. The first radar 1001 is configured to determine the distances between the agriculture UAV and ground reflectors in front of the agriculture UAV. The controller 1002 is communicatively connected to the first radar 1000 and configured to determine the terrain information in front of the agriculture UAV according to the distances between the agriculture UAV and the ground reflectors in front of the agriculture UAV, and adjust operation parameters of the agricultural UAV according to the terrain information.

In some embodiments, the operation parameters can include the route parameters and/or the task parameters.

In some embodiments, the controller 1002 can also be configured to control the flight attitude of the agriculture UAV according to the route parameters.

In some embodiments, the controller 1002 can also be configured to control the task status of the agriculture UAV according to the task parameters.

In some embodiments, determination by the controller 1002 of the terrain information in front of the agriculture UAV according to the distances can include the following processes. The horizontal distances and the vertical distances between the agriculture UAV and ground reflectors in front of the agriculture UAV can be determined by the controller 1002 according to the distances between the agriculture UAV and ground reflectors in front of the agriculture UAV and the angle of the emission direction of the radar waves of the first radar 1001 with respect to the horizontal direction. The terrain information in front of the agriculture UAV can be determined by the controller 1002 according to the horizontal distances and the vertical distances between the agriculture UAV and ground reflectors in front of the agriculture UAV.

In some embodiments, the controller 1002 can also be configured to determine the emission direction of the radar waves of the first radar 1001 according to the direction of the antenna of the first radar 1001.

In some embodiments, the controller 1002 can also be configured to determine the direction of the antenna of the first radar 1001 according to the installation angle of the first radar 1001.

In some embodiments, as shown in FIG. 10, the operation system also includes a motion sensor 1003. The motion sensor 1003 is configured to obtain the current flight attitude information of the agricultural UAV. The controller 1002 is communicatively connected to the motion sensor 1003. The controller 1002 is configured to determine the direction of the antenna of the first radar 1001 according to the installation angle of the first radar 1001 and the current flight attitude information of the agricultural UAV.

In some embodiments, the motion sensor can include at least one of an IMU, an accelerometer, a gyroscope, an altimeter, or a compass.

In some embodiments, as shown in FIG. 10, the operation system also includes a second radar 1004.

The second radar 1004 is configured to determine the relative heights from the ground reflectors below the agricultural UAV to the agricultural UAV.

The controller 1002 is communicatively connected to the second radar 1004 and configured to adjust the operation parameters of the agricultural UAV according to the terrain information, when the speed of the agricultural UAV is greater than the preset speed.

In some embodiments, the controller 1002 can also be configured to adjust the operation parameters of the agricultural UAV according to the relative heights, when the speed of the agricultural UAV is less than the preset speed.

In some embodiments, the controller 1002 can also be configured to adjust the distances between the agriculture UAV and ground reflectors in front of the agriculture UAV determined by the first radar 1001 according to the relative heights.

In some embodiments, the operation system also includes a third radar 1005.

The third radar 1005 is configured to determine the distances between the agricultural UAV and the obstacles on the side of the agricultural UAV.

The controller 1002 is communicatively connected to the third radar 1005 and configured to determine whether to perform the obstacle avoidance operation according to the distances between the agricultural UAV and the obstacles.

In some embodiments, the first radar 1001 can be installed at the frame of the agricultural UAV or at the load of the frame of the agricultural UAV obliquely with respect to the heading axis of the agricultural UAV.

In some embodiments, because the agricultural UAV can fly forward or backward, the first radar 1001 can be obliquely installed in front of the frame of the agricultural UAV or in front of the load of the frame, and/or behind the frame or behind the load. When the agricultural UAV is flying forward, the distances between the agriculture UAV and ground reflectors in front of the agriculture UAV can be determined by the first radar 1001 obliquely installed in front of the frame of the agricultural UAV or in front of the load of the frame. When the agricultural UAV is flying backward, the distances between the agriculture UAV and ground reflectors in front of the agriculture UAV can be determined by the first radar 1001 obliquely installed behind the frame or behind the load.

The front of the agricultural UAV is the same as the flight direction of the agricultural UAV and the front of the frame of the agricultural UAV and the front of the load are in the same direction as a nose of the agricultural UAV. The rear of the frame and the rear of the load are in the same direction as a tail of the agricultural UAV.

In some embodiments, the second radar 1004 can be installed below the frame of the agricultural UAV or below the load of the frame of the agricultural UAV. When the second radar is installed below the frame, the second radar can be provided below, for example, the fuselage of the frame, the stand of the frame, or the like.

In some embodiments, the ground reflectors can include the ground or the corps on the ground.

The controller 1002 can be configured to implement a method consistent with the disclosure, such as one of the example methods described above in connection with FIGS. 1, 2, and 6. The first radar 1001 can be configured to implement a method consistent with the disclosure, such as the example method described above in connection with FIG. 7. The implementation principle and technical effect are similar, and details thereof are omitted herein.

Figure 11:
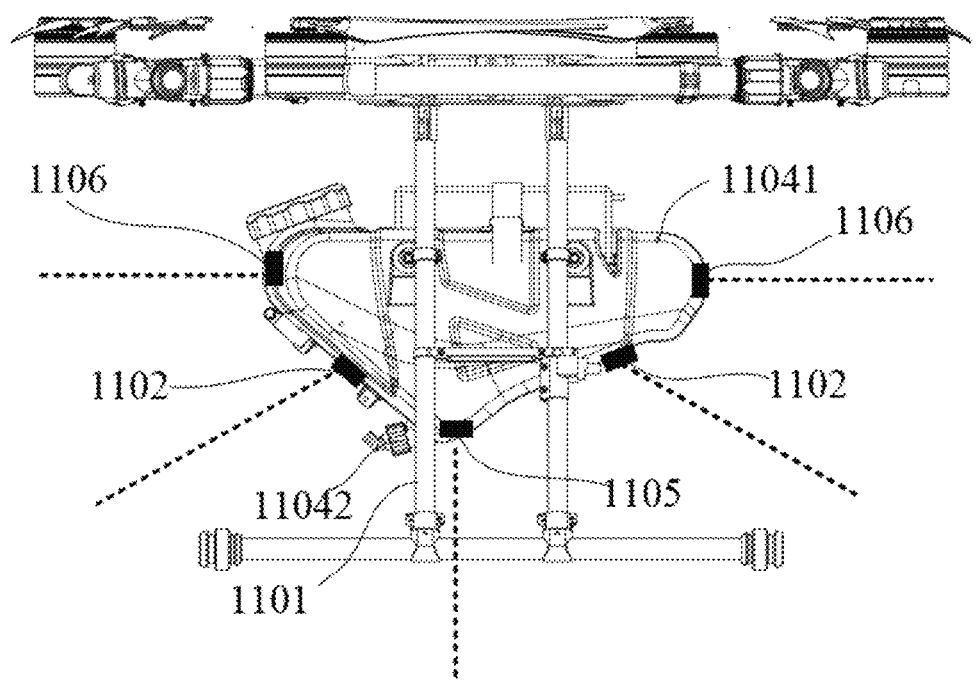
FIG. 11 is a schematic structure diagram of an agriculture UAV according to an embodiment of the disclosure.
Figure 12:
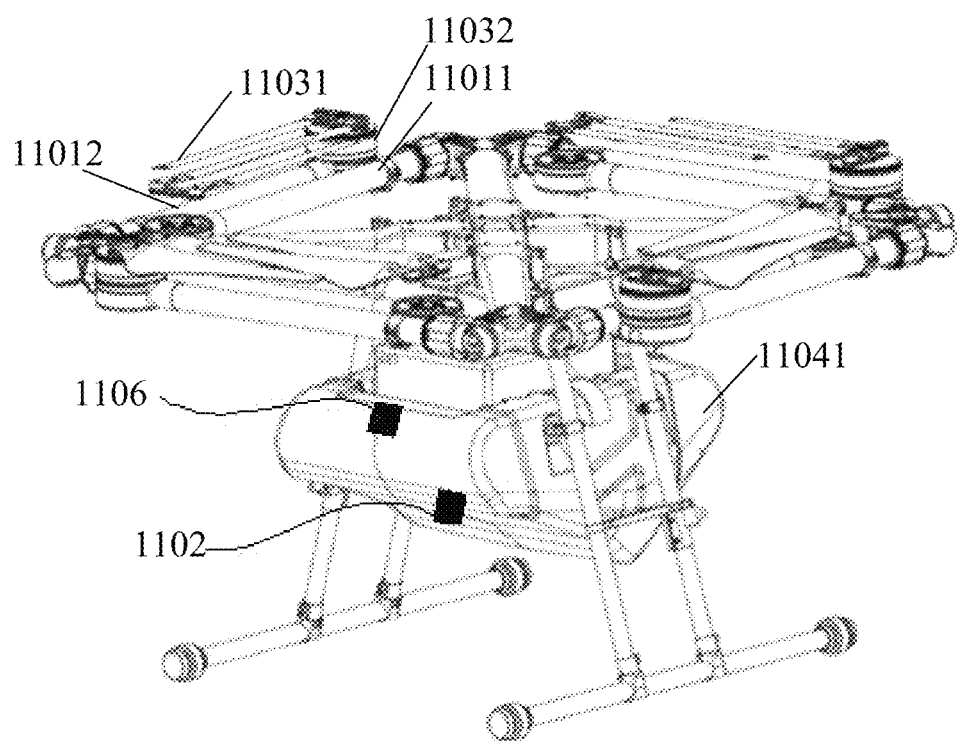
FIG. 12 is another schematic structure diagram of the agriculture UAV.

FIG. 11 is a schematic structure diagram of an exemplary agriculture UAV consistent with the disclosure. FIG. 12 is another schematic structure diagram of the exemplary agriculture UAV. As shown in FIGS. 11 and 12, the agricultural UAV includes a frame 1101, a controller (not shown) provided at the frame 1101, and a first radar 1102 provided at the frame 1101 or at the load of the frame 1101, for example, a holding tank 11041. The first radar 1102 is configured to determine the distances between the agriculture UAV and ground reflectors in front of the agriculture UAV. The controller is communicatively connected to the first radar 1102 and configured to determine the terrain information in front of the agriculture UAV according to the distances between the agriculture UAV and the ground reflectors in front of the agriculture UAV, and adjust parameters of the agricultural UAV according to the terrain information.

In some embodiments, the operation parameters can include the route parameters and/or the task parameters.

In some embodiments, the frame 1101 includes a fuselage. The fuselage includes a center component of the fuselage 11011 and at least an arm 11012 extending along the center component of the fuselage 11011. The agricultural UAV also includes a kinetic apparatus provided at the arm 11012. The controller is electrically connected to the kinetic apparatus and configured to control the kinetic apparatus according to the route parameters, so as to control the flight attitude of the agricultural UAV.

In some embodiments, as shown in FIG. 12, the kinetic apparatus includes one or more propellers 11031 and one or more motors 11032. The one or more motors 11032 are configured to drive the one or more propellers 11031 to rotate.

The controller can be configured to control the kinetic apparatus according to the route parameters. That is, the rotation speeds of the one or more motors 11032 can be controlled by the route parameters.

In some embodiments, the agricultural UAV also include a task apparatus provided at the frame 1101.

The controller is electrically connected to the task apparatus and configured to control the task apparatus according to the task parameters, so as to control the task status of the agricultural UAV.

In some embodiments, as shown in FIGS. 11 and 12, the task apparatus includes a holding tank 11041, a conduit (not shown), a pump (not shown), and a spray head 11042. An end of the conduit can extend into the holding tank 11041, the other end of the conduit can be connected to a suction inlet of the pump, and a discharge outlet of the pump can be connected to the spray head 11042. The pump can be configured to eject substance to be sprayed in the holding tank 11041 from the spray head 11042 through the conduit. The controller is electrically connected to the pump and configured to control the value of the pump pressure according to the task parameters.

In some embodiments, the operation system also includes a motor (not shown) for driving a deflection plate of the spray head to rotate. The controller is electrically connected to the motor and configured to control the rotation speed of the motor according to the task parameters.

In some embodiments, determination by the controller of the terrain information in front of the agriculture UAV according to the distances can include the following processes. The horizontal distances and the vertical distances between the agriculture UAV and ground reflectors in front of the agriculture UAV can be determined according to the distances between the agriculture UAV and ground reflectors in front of the agriculture UAV and the angle of the emission direction of the radar waves of the first radar 1102 with respect to the horizontal direction. The terrain information in front of the agriculture UAV can be determined according to the horizontal distances and the vertical distances between the agriculture UAV and ground reflectors in front of the agriculture UAV.

In some embodiments, the controller can also be configured to determine the emission direction of the radar waves of the first radar 1102 according to the direction of the antenna of the first radar 1102.

In some embodiments, the controller can also be configured to determine the direction of the antenna of the first radar 1102 according to the installation angle of the first radar 1102.

In some embodiments, the agriculture UAV also includes a motion sensor (not shown) provided at the frame 1101. The motion sensor can be configured to obtain the current flight attitude information of the agricultural UAV. The controller can be communicatively connected to the motion sensor. The controller can be configured to determine the direction of the antenna of the first radar 1102 according to the installation angle of the first radar 1102 and the current flight attitude information of the agricultural UAV.

In some embodiments, the motion sensor can include at least one of an IMU, an accelerometer, a gyroscope, an altimeter, or a compass.

In some embodiments, as shown in FIG. 11, the operation system also includes a second radar 1105 provided at the frame 1101 or at the load of the frame 1101, for example, the holding tank 11041.

The second radar 1105 is configured to determine the relative heights from the ground reflectors below the agricultural UAV to the agricultural UAV.

The controller is communicatively connected to the second radar 1105 and configured to adjust the operation parameters of the agricultural UAV according to the terrain information, when the speed of the agricultural UAV is greater than the preset speed.

In some embodiments, the controller can also be configured to adjust the operation parameters of the agricultural UAV according to the relative heights, when the speed of the agricultural UAV is less than the preset speed.

In some embodiments, the controller can also be configured to adjust the distances between the agriculture UAV and ground reflectors in front of the agriculture UAV determined by the first radar 1102 according to the relative heights.

In some embodiments, as shown in FIGS. 11 and 12, the operation system also includes a third radar 1106 provided at the frame 1101 or at the load of the frame 1101, for example, the holding tank 11041.

The third radar 1106 is configured to determine the distances between the agricultural UAV and the obstacles on the side of the agricultural UAV.

The controller is communicatively connected to the third radar 1106 and configured to determine whether to perform the obstacle avoidance operation according to the distances between the agricultural UAV and the obstacles.

In some embodiments, the ground reflectors can include the ground or the corps on the ground.

In some embodiments, the first radar 1102 can be installed at the frame 1101 of the agricultural UAV or at the load of the frame 1101 of the agricultural UAV obliquely with respect to the heading axis (not shown) of the agricultural UAV.

In some embodiments, because the agricultural UAV can fly forward or backward, the first radar 1102 can be can be obliquely installed in front of the frame 1101 of the agricultural UAV or in front of the load of the frame 1101, and/or behind the frame 1101 or behind the load. When the agricultural UAV is flying forward, the distances between the agriculture UAV and ground reflectors in front of the agriculture UAV can be determined by the first radar 1102 obliquely installed in front of the frame 1101 of the agricultural UAV or in front of the load of the frame 1101. When the agricultural UAV is flying backward, the distances between the agriculture UAV and ground reflectors in front of the agriculture UAV can be determined by the first radar 1102 obliquely installed behind the frame 1101 or behind the load.

The front of the agricultural UAV can be the same as the flight direction of the agricultural UAV and the front of the frame of the agricultural UAV and the front of the load can be in the same direction as a nose of the agricultural UAV. The rear of the frame and the rear of the load can be in the same direction as a tail of the agricultural UAV.

In some embodiments, the second radar 1105 can be installed below the frame of the agricultural UAV or below the load of the frame of the agricultural UAV. When the second radar is installed below the frame, the second radar can be provided below, for example, the fuselage of the frame, the stand of the frame, or the like.

In some embodiments, the agricultural UAV can be a multi-rotor UAV, such as a quadrotor UAV.

FIGS. 11 and 12 take the first radar 1102, the second radar 1105, and the third radar 1106 provided at the holding tank as an example. The first radar 1102 emits the radar waves obliquely downward, and the emitted radar waves are represented by a dashed line extending from the first radar 1102 in FIG. 11. The second radar emits the radar waves vertically downward, and the emitted radar waves are represented by a dashed line extending from the second radar 1105 in FIG. 11. The third radar horizontally emits the radar waves, and the emitted radar waves are represented by a dashed line extending from the third radar 1106 in FIG. 11.

The controller of the agriculture UAV can be configured to implement a method consistent with the disclosure, such as one of the example methods described above in connection with FIGS. 1, 2, and 6. The first radar 1102 can be configured to implement a method consistent with the disclosure, such as the example method described above in connection with FIG. 7. The implementation principle and technical effect are similar, and details thereof are omitted herein.

It is intended that the schematic structure diagrams of the agriculture UAV shown in FIGS. 11 and 12 are considered as exemplary only and not to limit the structure of the UAV.

The first radar, the second radar, and the third radar can include directional radars or phased array radars. For example, as shown in FIGS. 11 and 12, the first radar 1102, the second radar 1105, and the third radar 1106 can be separate directional radars. In some other embodiments, the first radar, the second radar, and the third radar can be integrated together as a phased array radar.

It can be appreciated by those skilled in the art that part or all of the processes of a method consistent with the disclosure can be implemented in the form of computer program stored in a non-transitory computer-readable storage medium, which can be sold or used as a stand-alone product. The computer program can include instructions that enable a computer device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An operation method of an unmanned aerial vehicle (UAV) comprising:
   determining a distance between the UAV and a ground reflector in front of the UAV by using a radar wave emitted obliquely downward by a radar carried by the UAV;
   determining terrain information in front of the UAV according to the distance between the UAV and the ground reflector in front of the UAV; and
   adjusting one or more task parameters of the UAV, including:
      in response to a speed of the UAV being greater than a preset speed, adjusting the one or more task parameters according to the terrain information; and
      in response to the speed of the UAV being less than the preset speed, adjusting the one or more task parameters according to a relative flight height of the UAV with respect to the ground below the UAV, wherein:
      the task parameter is configured to indicate a control parameter of a task apparatus of the UAV; and
      in response to the one or more task parameters being not adjusted in time according to the relative flight height of the UAV with respect to the ground, the one or more task parameters are adjusted in advance according to the terrain information; and
   spraying substance to the ground and adjusting a spray density and a spray range by one of: maintaining a fixed relative flight height of the UAV with respect to the ground below the UAV and adjusting the task parameter, or, adjusting the relative flight height of the UAV with respect to the ground below the UAV and maintaining the task parameter.

2. The method of claim 1, wherein a flight attitude of the UAV is controlled according to a route parameter of the UAV.

3. The method of claim 1, further comprising:
   controlling a task status of the UAV according to one of the one or more task parameters.

4. The method of claim 1, wherein determining the terrain information in front of the UAV includes:
   determining a horizontal distance and a vertical distance between the UAV and the ground reflector in front of the UAV according to:
      the distance between the UAV and the ground reflector in front of the UAV, and
      an angle between an emission direction of the radar wave of the radar and a horizontal direction; and
   determining the terrain information in front of the UAV according to the horizontal distance and the vertical distance.

5. The method of claim 4, further comprising:
   determining the emission direction of the radar wave of the radar according to a direction of an antenna of the radar.

6. The method of claim 5, further comprising:
   determining the direction of the antenna of the radar according to an installation angle of the radar.

7. The method of claim 6, wherein determining the direction of the antenna of the radar includes:
   determining the direction of the antenna of the radar according to the installation angle of the radar and current flight attitude information of the UAV.

8. The method of claim 1,
   wherein the radar is a first radar;
   the method further comprising:
      determining a relative height from a ground reflector below the UAV to the UAV by using a radar wave emitted vertically downward by a second radar carried by the UAV.

9. The method of claim 8, further comprising, in response to the terrain information indicating a terrain in front of the UAV is flat:
   adjusting the distance between the UAV and the ground reflector in front of the UAV determined by the first radar according to the relative height.

10. The method of claim 1, further comprising:
    determining a distance between the UAV and an obstacle on a side of the UAV by using a radar wave emitted horizontally by an obstacle avoidance radar carried by the UAV; and
    determining whether to perform an obstacle avoidance operation according to the distance between the UAV and the obstacle.

11. An operation method of an unmanned aerial vehicle (UAV) comprising:
    emitting, by a radar of the UAV, a radar wave toward ground in front of the UAV;
    receiving, by the UAV, an echo after the radar wave reflected by a ground reflector in front of the UAV;
    determining, by the UAV, a distance between the UAV and the ground reflector in front of the UAV according to the radar wave and the echo;
    determining, by the UAV, terrain information in front of the UAV according to the distance between the UAV and the ground reflector in front of the UAV;
    adjusting, by the UAV, one or more task parameters of the UAV, including:
       in response to a speed of the UAV being greater than a preset speed, adjusting the one or more task parameters according to the terrain information; and
       in response to the speed of the UAV being less than the preset speed, adjusting the one or more task parameters according to a relative flight height of the UAV with respect to the ground below the UAV, wherein:
       the task parameter is configured to indicate a control parameter of a task apparatus of the UAV; and
       in response to the one or more task parameters being not adjusted in time according to the relative flight height of the UAV with respect to the ground, the one or more task parameters are adjusted in advance according to the terrain information; and spraying, by the UAV, substance to the ground, and adjusting, by the UAV, a spray density and a spray range by one of: maintaining a fixed relative flight height of the UAV with respect to the ground below the UAV and adjusting the task parameter, or, adjusting the relative flight height of the UAV with respect to the ground below the UAV and maintaining the task parameter.

12. The method of claim 11, wherein the ground reflector include the ground or a crop on the ground.

13. An operation system of an unmanned aerial vehicle (UAV) comprising:
a radar provided at the UAV and configured to determine a distance between the UAV and a ground reflector in front of the UAV; and
a controller communicatively connected to the radar and configured to:
determine terrain information in front of the UAV according to the distance between the UAV and the ground reflector in front of the UAV; and
adjust one or more task parameters of the UAV, including:
in response to a speed of the UAV being greater than a preset speed, adjusting the one or more task parameters according to the terrain information; and
in response to the speed of the UAV being less than the preset speed, adjusting the one or more task parameters according to a relative flight height of the UAV with respect to the ground below the UAV, wherein:
the task parameter is configured to indicate a control parameter of a task apparatus of the UAV; and
in response to the one or more task parameters being not adjusted in time according to the relative flight height of the UAV with respect to the ground, the one or more task parameters are adjusted in advance according to the terrain information; and
a task apparatus electrically connected to the controller, wherein the controller is further configured to control the task apparatus to spray substance to the ground and adjust a spray density and a spray range by one of: maintaining a fixed relative flight height of the UAV with respect to the ground below the UAV and adjusting the task parameter, or adjusting the relative flight height of the UAV with respect to the ground below the UAV and maintaining the task parameter.

14. The system of claim 13, wherein the controller is further configured to:
control a flight attitude of the UAV according to a route parameter of the UAV.

15. The system of claim 13, wherein the controller is further configured to:
control a task status of the UAV according to one of the one or more task parameters.

16. The system of claim 13, wherein the controller is further configured to:
determine a horizontal distance and a vertical distance between the UAV and the ground reflector in front of the UAV according to:
the distance between the UAV and the ground reflector in front of the UAV, and
an angle between an emission direction of the radar wave of the radar and a horizontal direction; and
determine the terrain information in front of the UAV according to the horizontal distance and the vertical distance.

17. The system of claim 16, wherein the controller is further configured to:
determine the emission direction of the radar wave of the radar according to a direction of an antenna of the radar.

* * * * *